(12) United States Patent
Handler

(10) Patent No.: US 9,793,693 B1
(45) Date of Patent: Oct. 17, 2017

(54) ADJUSTABLY POSITIONABLE CABLE DROPOUT FOR CABLE TRAY

(71) Applicant: Jordan Handler, Rye Brook, NY (US)

(72) Inventor: Jordan Handler, Rye Brook, NY (US)

( * ) Notice: Subject to any disclaimer, the term of this patent is extended or adjusted under 35 U.S.C. 154(b) by 0 days.

(21) Appl. No.: 15/415,425

(22) Filed: Jan. 25, 2017

(51) Int. Cl.
    *H02G 3/04*     (2006.01)
    *F16L 3/26*     (2006.01)

(52) U.S. Cl.
    CPC ............. *H02G 3/045* (2013.01); *F16L 3/26* (2013.01)

(58) Field of Classification Search
    CPC ......... H02G 3/045; H02G 3/0456; F16L 3/26; F16L 3/28
    USPC ......... 248/49; 174/68.1, 68.3, 72 A, 58, 481
    See application file for complete search history.

(56) References Cited

U.S. PATENT DOCUMENTS

| | | | | |
|---|---|---|---|---|
| 5,639,048 A | * | 6/1997 | Bartholomew | ............ F16L 3/26 248/49 |
| 6,313,405 B1 | * | 11/2001 | Rinderer | .............. H02G 3/0456 174/68.3 |
| 8,424,814 B2 | * | 4/2013 | Davis | ................... H02G 3/0443 248/49 |
| 9,209,609 B2 | * | 12/2015 | Kellerman | ........... H02G 3/0608 |

* cited by examiner

*Primary Examiner* — Todd M Epps
(74) *Attorney, Agent, or Firm* — Ostrolenk Faber LLP

(57) ABSTRACT

A cable dropout for a cable tray: The cable tray has side rails. Rungs at spaced intervals along the side rails define the width of the tray with the side rails. The tray side rails have laterally outward extensions at the bottom regions of the side rails for mounting a cable path re-directing dropout to the tray. The dropout has a convexly curved surface for redirecting and supporting a cable from its path on the tray to below the tray. A mounting bar at the entrance region of the dropout from the tray has laterally outward extensions clamped to the bottom region outward extensions at the bottom region of the side rails, so that the mounting bar may be clamped at any location along the side rails.

7 Claims, 3 Drawing Sheets

ADJUSTABLY POSITIONABLE CABLE DROPOUT FOR CABLE TRAY

BACKGROUND OF THE INVENTION

A cable tray supports electric power cables and/or data cables along a path above apparatus which receives the power cables and/or data cables from the cable tray. One type of cable tray comprises laterally spaced apart side rails which are connected by rungs along the side rails at spaced intervals of a few inches to many inches. The cables extending along the cable tray are supported on the rungs.

At spaced locations along the cable tray, apparatus to be served by at least some of the cables are located below the cable tray. Cables for connection to a particular apparatus are redirected by a cable dropout out of the bottom of the cable tray to extend toward the apparatus below the tray. A typical cable dropout for this type of cable tray includes a cable redirecting surface that is gradually convexly curved downwardly from extending horizontally or along the cable tray path to being directed downwardly toward the apparatus. The cables to be dropped out at a particular dropout location pass from above to below the rungs of the cable tray that precede the cables extending toward the dropout and, then the cables are guided against the curved dropout surface by which they are directed downward.

A cable dropout may be supported on a fixed position rung between the side rails of the cable tray. The cable dropout may start at or below the rung to which it is attached and curve downward. The dropout usually extends below the side rails of the cable tray.

For a known cable dropout, the only support for the dropout extending below the cable tray is its attachment at a rung between the side rails. When the cable dropout is used to redirect cables toward a particular apparatus below the cable tray, the cable dropout is likely attached to and supported on the cable tray rung that is closest to the apparatus below being served.

The desired spacing apart of rungs of a cable tray is a matter of choice for the particular application. Each cable tray has standard spacings between its rungs, which typically vary from a few inches to many inches. If an apparatus being served by a known cable dropout is below but not near enough to a rung in the path along a cable tray, so that the cable being dropped out does not extend approximately straight down to that apparatus or at a desired angle down from a tray rung and toward the apparatus, the cable may be undesirably long, or may be undesirably bent at the bottom edge of the dropout, or the cable may contact or interfere with another cable or object on the path of the cable toward the apparatus or be otherwise unfavorably placed for achieving best long term existence and maintenance. It is preferable to support the cable dropout and its curved surface above a selected location, such as where the cables to be dropped from the cable tray are most efficiently placed, according to the designer who is attaching cable to the apparatus. It is desirable that the cable dropout not be restricted to placement on the cable tray at the location of a rung.

SUMMARY OF THE INVENTION

It is an object of the invention to select a preferred location along the path of a cable tray at which a cable dropout for cables supported by the cable tray may be located.

To achieve that object, the cable dropout is attachable not only to a rung, e.g. one that is closest to being above the apparatus. Instead, the cable dropout is secured to laterally outward extensions at bottom regions of both side rails of the cable tray and at any selected location along the side rails, including in a gap between two rungs or even at a rung, as the installer deems efficient to serve the apparatus with its cables. Typically, a cable dropout would be placed in a gap between rungs, to provide a long enough space between rungs for the dropout and the cables on it to pass downward without interfering with the cables passing along the below described convex curvature of the surface of the cable dropout.

The cable dropout is a separate part that has a mounting, preferably a bar at the entrance region at the upper end of the dropout, which is the end of the dropout at the cable tray. The mounting bar is located at, shaped to be supported on and attached to the bottom region laterally outward extensions of both of the side rails of the cable tray. The mounting bar of the cable dropout is preferably secured along the length of the side rails, at a location at a gap between two rungs, by a fastening device, which may be of any usual type that is used to fasten an object along a rail or flange. In a preferred embodiment, the cable dropout mounting bar has or comprises laterally outward extensions from both sides of the dropout, which extensions are positioned below both bottom region laterally outward extensions of the side rails, where the laterally outward extensions of the mounting bar are attached, e.g. clamped to and below both lower side laterally outward extensions of the side rails.

The mounting bar and the entrance region to the curved dropout surface may all be below the nearby rungs and below the bottom region laterally outward extensions from the side rails, so that no cable contacts the dropout until the cable is at or below the entrance region for the cable onto the curved cable dropout surface.

The cables run along a path defined by the top sides of the rungs. Cables selected for redirection by a cable dropout initially contact the upstream entrance region of the downwardly curved convex, surface of the cable dropout, and the curved dropout directs the cables downwardly toward an apparatus.

Other features and advantages of the present invention will become apparent from the following description of the invention which refers to the accompanying drawings.

DESCRIPTION OF A PREFERRED EMBODIMENT

The purpose of a cable tray is to support cables of any sort, including power cables, data cables, and sometimes even air or liquid carrying hoses, or other elongate flexible articles to extend along the cable tray. For example, the cables on the cable tray may be connected to a power source, or a data source, or the like. At another end of the cables remote from the power source, at least some of the cables are connected to a power consumer or apparatus to be served by those cables. The length of the cable tray between the power source and the power consumer is a matter of choice, depending upon the particular installation.

Figure 1:
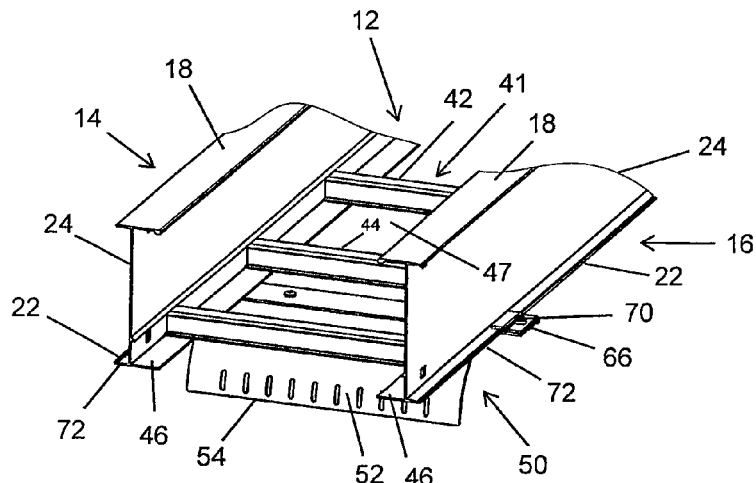
FIG. 1 is a perspective view of a fragment of a cable tray and a cable dropout attached to the cable tray'
Figure 2:
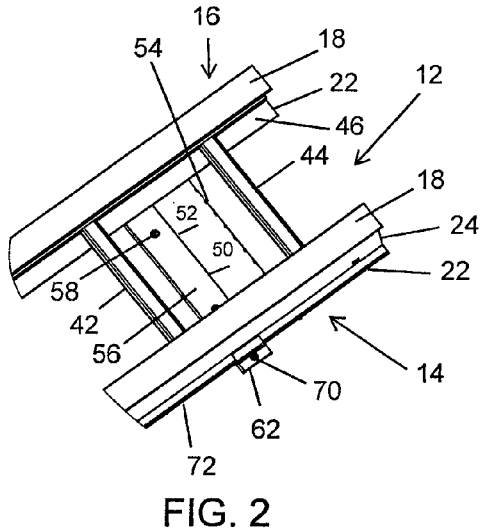
FIG. 2 is a top perspective view thereof.
Figure 3:
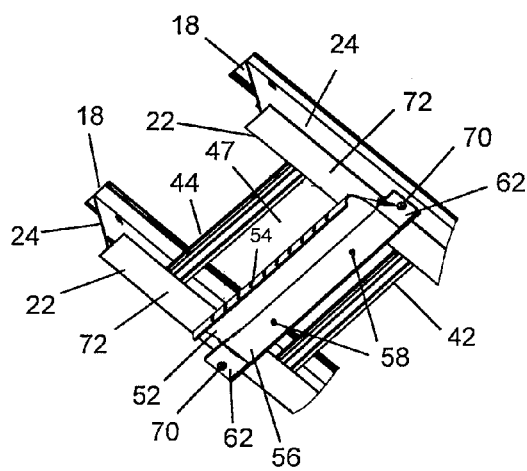
FIG. 3 is a bottom perspective view thereof.
Figure 4:
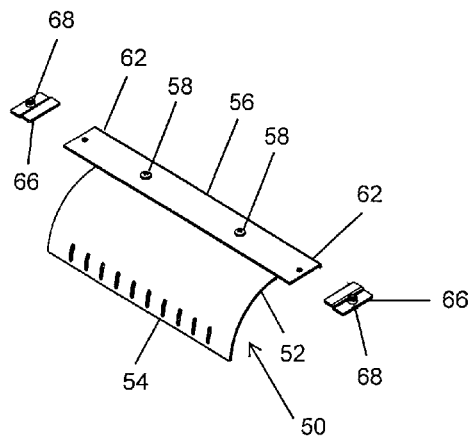
FIG. 4 is a perspective view of the cable dropout.
Figure 5:
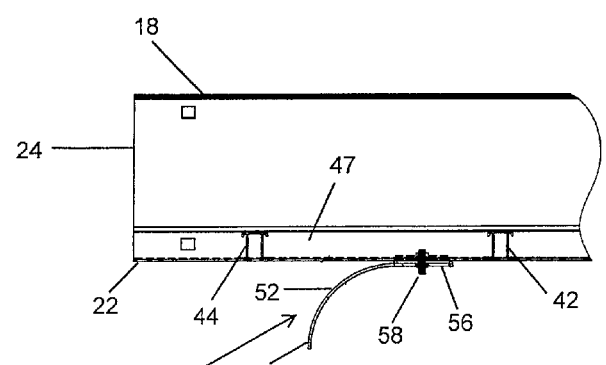
FIG. 5 is a sectional view of the cable tray and cable dropout on line 5-5 of FIG. 6.
Figure 6:
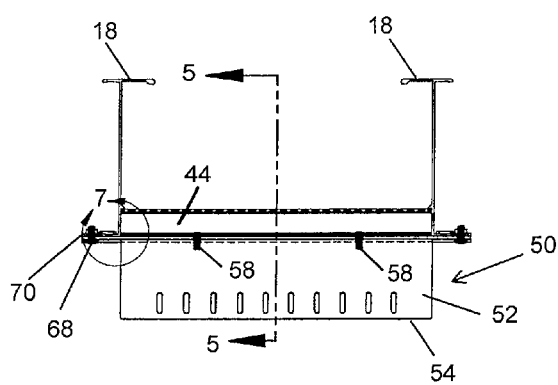
FIG. 6 is a transverse, cross-sectional view of the cable tray at an entrance end region of the cable dropout.
Figure 7:
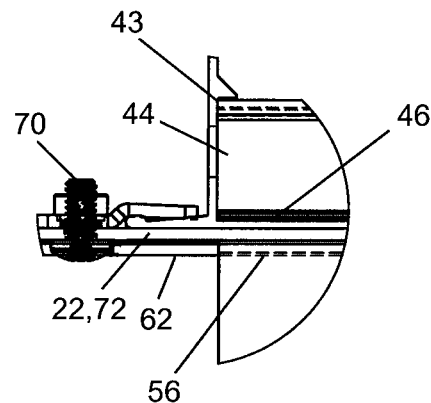
FIG. 7 is an enlarged view of detail 7 in FIG. 6.
Figure 8:
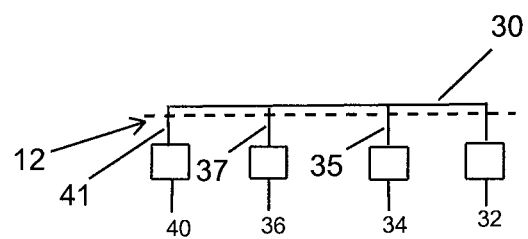
FIG. 8 schematically illustrates features of a cable tray, hereof.

A fragment of a cable tray 12 is shown in FIGS. 1-3, 5 and 6. The cable tray may be comprised of a pair of side rails 14, 16, each generally in the shape of an I-beam, wherein each side rail includes a top flange 18, a bottom flange 22, and a connecting panel 24 between the top flange and the bottom flange. Referring to FIG. 8, the cable tray 12 may be up to many feet in length, as it supports cables 30 extending from a power source 32 to up to a plurality of power consumer apparatus 34, 36 and 40.

At regular spaced apart intervals along the direction of the side rails 14, 16, rungs 41, of which two such rungs 42 and 44 are illustrated, are permanently affixed to both side rails 14, 16, e.g. by capture in a slot 43 on the side rails and/or by being bolted in place at spaced intervals along the lower, inwardly extending flanges 46 of the bottom flanges of the two side rails. The attached rungs set the width of the cable tray. There are open gaps 47 between neighboring rungs. Cables may be redirected down from their path along the cable tray through any of the gaps 47.

Referring to FIG. 8, cables 30 extend along a path on the tray 12 from the power source 32 for each cable 30 and are supported on the rungs 42, 44, et al. Selected individual cables 35, 37, 41, et al. are redirected down to respective locations below the cable tray where a respective power consumer apparatus 34, 36, 40, et al. is located below the cable tray. Preferably, each cable should not be bent at a sharp radius, particularly not around a rung of the cable tray, which may damage the cable. The cable should be able to be redirected in the best selected direction or angle off the cable tray, which causes the least harm to the cable or any object the cable passes and which directs the cable to avoid any object on its path from the cable tray to the power consumer. The foregoing applies during and after passage of cables 35, 37, 41, et al. on the dropout and their attachments to apparatus 34, 36, 40, etc.

It is known to provide a cable tray dropout, of which dropout 50 is an example, which changes the direction of the path for the cable. As shown in FIGS. 1, 3, 4 and 5, the cable dropout 50 herein comprises a convexly curved tray surface 52 which has a gradual, not sharp or small, radius curvature downward, and which has a larger radius than a cable tray rung 41 would provide. The dropout 50 starts from the underside of the cable tray 12, where the tray surface 52 is then generally parallel to the direction of the cable tray, downward in an arc or an otherwise gradually curved shape of the surface 52 to the bottom end 54 of the surface 52 aimed below the cable tray 12 and aimed generally in the direction of a power consumer apparatus 34, 36, 40, et al. to be served by the cables directed toward the apparatus. That surface provides support for a cable preferably during its entire redirection from the path in the direction along the cable tray to the direction toward the power consumer. After that redirection, the cable extends beyond and below the dropout.

The dropout 50, 52 is connected at its upper or entrance end entrance region to the cable tray. In particular, at its entrance region, the dropout 50 has a mounting bar 56 fixed at the upper end of the surface 52 by bolts or rivets at 58. The mounting bar 56 is wider than the redirection surface part 52 of the dropout and has at both ends or is comprised of a laterally outwardly projecting extension 62 at both ends. For convenience in positioning and fastening the cable tray to the cable dropout 50, the mounting bar 56 of the dropout is preferably attached to the side rails so that at least its surface 52 is at a gap between neighboring rungs 42, 44.

As shown in FIGS. 1-4, 6 and 7, a respective clamp 66 is installed at both laterally outward extensions 62 of the mounting bar 56. The clamp has a mounting hole 68 through it, which receives a clamping bolt 70.

The mounting bar extensions 62 are placed below the bottom regions outwardly extending projecting portions 72 of the lower flanges 22 of the side rails 14,16. The mounting bar extensions 62 are attached to the portions 72 of the side rails by the clamps 66. The clamps engage the mounting bar extensions 62 from below the laterally outwardly projecting extensions 62 and engage the bottom region laterally outward extensions of the side rails 72 from above, and via the illustrated bolts 70, the clamps 66 attach the mounting bar 56 by its extensions 62 to the underside of the outward extensions 72 of the side rails 14, 16. This secures the dropout on the underside of the side rails of the cable tray and secures it against moving along the path of the cable tray. Also, since the attachment of the laterally outward extensions 62 of the mounting bar 56 to the laterally outward extensions 72 of the side rails is by the clamps 66, and since there are no bolts or the like location fixing elements passing through the outwardly projecting extensions 72 of the side rails, the mounting bar 56 and the attached dropout 50 can be positioned at any location along the side rails 14, 16 and not only at preset spaced intervals, e.g. not only at a rung.

The cable dropout 50 is shown convexly curved in one direction for directing the cable approaching the dropout toward its mounting bar from one direction and redirecting it downwardly. However, because for example, the cable tray may also be carrying cable extending along the cable tray from the opposite direction, e.g. may be carrying cable extending along the cable tray from a power source at a different location along the cable tray, there may be a dropout curved in the opposite direction from the dropout illustrated in the Figures and at a different location along the cable tray. That other dropout would be attached to the cable tray in the same way as the illustrated dropout, but with its surface curving down in the opposite direction. Both such differently directed dropouts might also be attached to the side rails of the cable tray at different locations or at a common location, for example.

This arrangement of an attachment of a cable dropout to a cable tray has benefits. First, the cable need not be severely bent around a sharp radius as it extends from the path along the cable raceway toward a power consumer which is below the cable raceway. The cable need not wrap around the smaller radius surface of a rung as it changes direction. For this purpose it is preferable for the dropout to be attached along the raceway spaced away from the rungs in the raceway, so as to not cause the cable to sharply redirect around a smaller radius caused by a rung. The cable dropout can be placed at any convenient location unaffected by having to attach the dropout at the location of a rung. The convexly curved surface of the cable dropout prevents a bend in the cable passing over the curved surface, which might cause damage to a cable extending down and past the dropout surface during or after installation of the cable to an apparatus served by the cable.

The present invention is not limited to the embodiments described above. Various alternatives, modifications and equivalents can be used. For this reason, the embodiments named above do not limit the scope of the invention, which is defined by the attached patent claims.

What is claimed is:

1. In combination, a cable tray and a cable dropout for the cable tray, the combination comprising:
   the cable tray is configured for supporting cables along a cable path, the cable tray comprising:
   first and second separated side rails extending along the cable path;
   a plurality of rungs extending across the cable tray and attached to the side rails, such that the rungs define a width of the cable tray and define a support path of the cable tray on which cables extending along the path of the cable tray are supported; the rungs are spaced apart along the side rails at selected spaced intervals, and are positioned toward a bottom of the cable tray, so that there are open gaps at a bottom region of the cable tray between adjacent rungs;
   each of the side rails has a bottom region with a bottom laterally outward extension away from the other side rail;
   the cable dropout is attached at a selected location along the side rails and at the bottom region of the cable tray;
   the dropout having an entrance region at the bottom region of the cable tray;
   the dropout comprising a convex surface for supporting at least one cable coming off traveling in a direction of the cable path of the cable tray, and the surface curving downward below the cable tray, the surface having a radius large enough that the surface is intended not to cause and to prevent such a bend in the cable which might cause damage to the cable extending down and past the dropout surface during or after installation of the cable to an apparatus.

2. The combination of claim 1, further comprising:
   a mounting bar at the entrance region of the dropout and at a start of the curved surface;
   the mounting bar comprising laterally outward extensions extending outward in a direction across the dropout and located at least below a height on the side rails of rungs near the dropout and below the laterally outward extensions of the mounting bar at each side rail; and
   the laterally outward extensions of the mounting bar being fastened to a bottom laterally outward extensions at each of the side rails, so as to attach the dropout to the cable tray.

3. The combination of claim 2, further comprising the fastening of the laterally outward extensions of the mounting bar to the bottom laterally outward extension at each of the side rails comprises a respective clamp located and configured to clamp together each laterally outward extension of the mounting bar and a respective one of the bottom laterally outward extensions at each side rail, whereby no direct fastening of the mounting bar to either one of the side rails for selecting a location of the fastening along the side rails is required.

4. The combination of claim 2, wherein the dropout is placed, so that the mounting bar is spaced along the cable tray at a gap between the rungs.

5. The combination of claim 1, further comprising each side rail including a laterally inward extension toward the other side rail, and a bottom.

6. The combination of claim 5, wherein both of the bottom laterally inward and the bottom laterally outward extensions on each side rail are defined by a single height flange extending across each side rail.

7. The combination of claim 5, wherein the rungs are located above the bottom laterally inward extensions on the side rails.

* * * * *